United States Patent [19]
Duvall

[11] Patent Number: 5,522,428
[45] Date of Patent: Jun. 4, 1996

[54] NATURAL GAS VEHICLE TANK LIFE SENSOR AND CONTROL

[76] Inventor: Paul F. Duvall, c/o Brunswick Corporation, 1 N. Field Ct., Lake Forest, Ill., 60045-4811

[21] Appl. No.: 297,657

[22] Filed: Aug. 29, 1994

[51] Int. Cl.⁶ .................................................. G05D 16/00
[52] U.S. Cl. .......................................... 137/624.11; 141/94
[58] Field of Search ........................... 137/624.11; 141/94

[56] References Cited

U.S. PATENT DOCUMENTS

| | | |
|---|---|---|
| 4,223,692 | 9/1980 | Perry . |
| 4,527,600 | 7/1985 | Fisher et al. ........................... 141/94 X |
| 4,911,192 | 3/1990 | Hartfiel et al. .................. 137/624.11 X |
| 4,966,206 | 10/1990 | Baumann et al. . |
| 5,029,622 | 7/1991 | Mutter . |
| 5,127,230 | 7/1992 | Neeser et al. . |
| 5,157,610 | 10/1992 | Asano et al. . |
| 5,213,838 | 8/1993 | Cieslukowski . |
| 5,259,424 | 11/1993 | Miller et al. . |

*Primary Examiner*—Kevin Lee
*Attorney, Agent, or Firm*—John R. Hoffman

[57] ABSTRACT

A natural gas vehicle fuel system includes a composite pressure vessel for storing natural gas. The vessel includes an internal storage space accessible via a port opening. A solenoid valve is operatively coupled to the port opening for selectively connecting the storage space to a natural gas supply for filling or to a vehicle engine, in use. A sensor is integrally mounted with the vessel for sensing a select event of vessel operation indicative of the vessel exceeding a useful life expectancy. A control is operatively associated with the sensor for controlling the valve operation, the control preventing further operation of the solenoid valve after the vessel has exceeded the useful life expectancy.

10 Claims, 2 Drawing Sheets

NATURAL GAS VEHICLE TANK LIFE SENSOR AND CONTROL

FIELD OF THE INVENTION

This invention relates to natural gas vehicle fuel systems and, more particularly, to a natural gas vehicle tank life sensor and control.

BACKGROUND OF THE INVENTION

To avoid dependence on unreliable sources of fuel, automotive manufacturers have investigated developing vehicle engines powered by natural gas. Unlike conventional gasoline operated fuel systems, natural gas is stored in a pressure vessel prior to use by the engine. Any failure of such a pressure vessel could produce catastrophic results.

Advantageously, a natural gas vehicle fuel system should be made failsafe. Unfortunately, neither static nor cyclic fatigue of a pressure vessel has sharply defined cutoff points. While a tank life could arbitrarily be set at, for example, fifteen years, some vessels may be used for longer, such as thirty years, or until they fail.

The present invention is directed to solving one or more of the problems discussed above in a novel and simple manner.

SUMMARY OF THE INVENTION

In accordance with the invention there is disclosed a natural gas vehicle fuel system provided with means for preventing further operation after a vessel has exceeded a useful life expectancy.

Broadly, there is disclosed herein a natural gas vehicle fuel system including a composite pressure vessel for storing natural gas, the vessel including an internal storage space accessible via a port opening. A solenoid valve is operatively coupled to the port opening for selectively connecting the storage space to a natural gas supply for filling or to a vehicle engine, in use. Sensing means are integrally mounted with the vessel for sensing a select event of vessel operation indicative of the vessel exceeding a useful life expectancy. Control means are operatively associated with the sensing means for controlling the valve operation, the control means preventing further operation of the solenoid valve after the vessel has exceeded the useful life expectancy.

It is a feature of the invention that the sensing means comprises a strain sensor.

It is another feature of the invention that the strain sensor and the control means count the number of fill cycles of the vessel and the control means prevents further operation of the solenoid valve after a select number of fill cycles.

It is yet another feature of the invention that the strain sensor and the control means count a number of fill cycles of the vessel within each of plural select fill pressure ranges and the control means prevents further operation of the solenoid valve after a distinct select number of fill cycles within each such pressure range.

It is another feature of the invention that the strain sensor and control means count the number of fill cycles of the vessel within each of plural select fill pressure ranges and the control means prevents further operation of the: solenoid valve after a select combined number of fill cycles within all such pressure ranges collectively.

It is yet an additional feature of the invention that the sensing means comprises a temperature sensor.

It is still a further feature of the invention that the control means includes means for determining if sensed temperature exceeds a select temperature limit for a select time period and in response thereto preventing further operation of the solenoid valve.

It is yet still another feature of the invention that the control means includes means for determining if sensed temperature exceeds plural select temperature limits for a respective inversely related select time period and in response thereto preventing further operation of the solenoid valve.

It is yet another feature of the invention that the sensing means comprises an acoustic emission sensor.

It is still another feature of the invention that the control means includes means for determining if the sensed acoustic emissions exceed a select emission limit for a select time period and in response thereto preventing further operation of the solenoid valve.

Further features and advantages of the invention will be readily apparent from the specification and from the drawing.

DETAILED DESCRIPTION OF THE INVENTION

Figure 1:
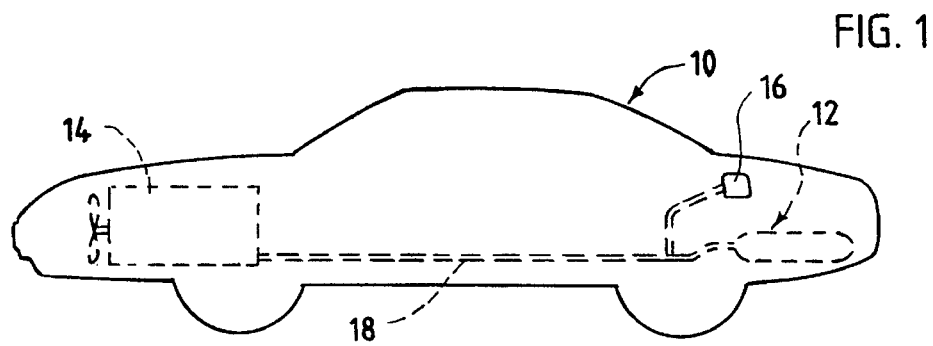
FIG. 1 is a perspective view of a vehicle including a natural gas fuel system according to the invention.

Referring initially to FIG. 1, a conventional vehicle 10 is illustrated incorporating a natural gas vehicle fuel system 12 according to the invention. Particularly, the vehicle 10 includes an engine 14 operated using natural gas as a fuel source. The natural gas is supplied from the vehicle fuel system 12. The vehicle fuel system 12 is replenished using an inlet 16. Various fuel lines 18 are used for operatively connecting the inlet 16 and engine 14 to the fuel system 12.

Figure 2:
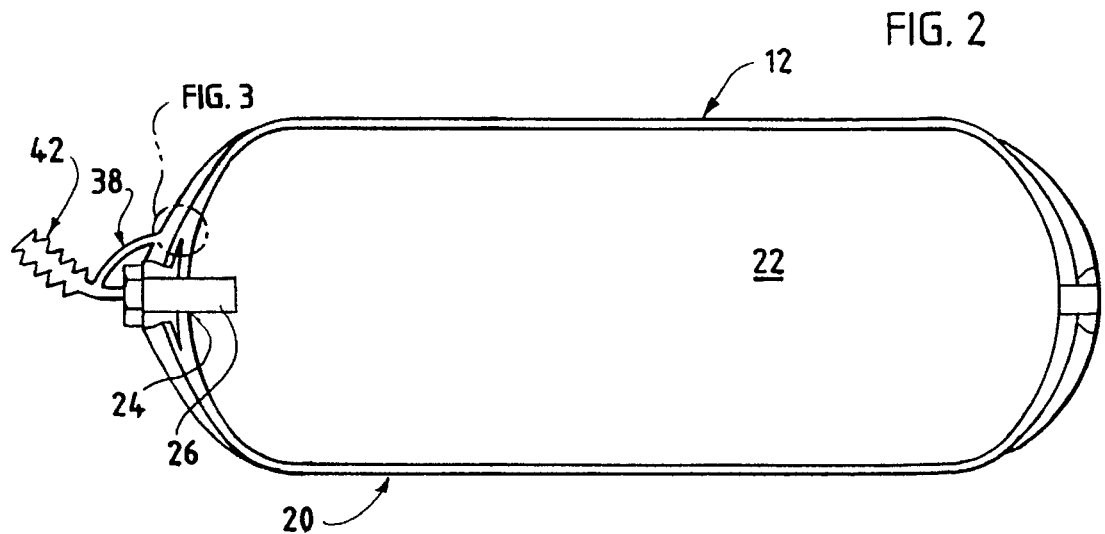
FIG. 2 is a sectional view illustrating the natural gas vehicle fuel system according to the invention.
Figure 3:
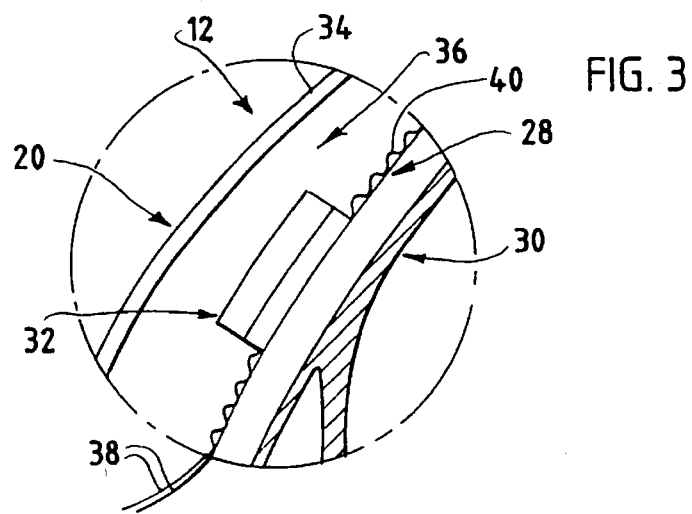
FIG. 3 is a detailed view taken from FIG. 2.

Referring to FIGS. 2 and 3, the natural gas fuel system 12 comprises a composite pressure vessel 20 for storing natural gas. The vessel 20 includes an internal storage space 22 accessible via a port opening 24. A submerged solenoid valve 26 is received in the port opening 24. The solenoid valve 26 selectively connects the storage space 22 to the fuel lines 18, see FIG. 1, for filling the storage space 22 with natural gas or supplying natural gas to the vehicle engine 14, in use.

In accordance with the invention, the vessel 20 includes integrally mounted sensors and a controller for determining if the vessel 20 has exceeded a useful life expectancy and in response thereto preventing further operation of the solenoid 26.

With particular reference to FIG. 3, the vessel 20 includes a primary load bearing composite shell 28. The inside of the composite shell 28 is lined with a non-load bearing liner 30. A microcontroller or CPU 32 is mounted to the outside of the shell 28. The CPU 32 is then housed within an outer external composite shell 34. The space 36 between the outer shell 34 and load bearing composite shell 28 is filled with a foam energy absorber. The microcontroller 32 is connected via a first set of leads 38 to the electrically actuated solenoid 26 and via a second set of leads 40 to various sensors, described below.

Figure 4:
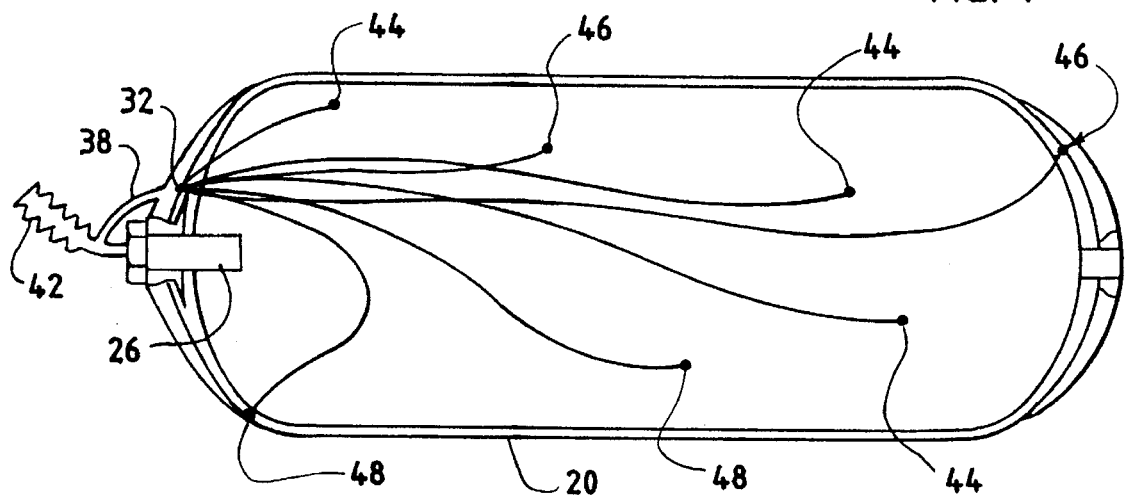
FIG. 4 is a view similar to that of FIG. 2 showing sensing devices integrally mounted to the vessel.

Referring to FIG. 4, the solenoid 26 and microcontroller 32 are powered by leads 42 to the vehicle power supply. Electrically connected to the microcontroller 32 are a plurality of acoustic emission sensors 44, a pair of pressure or strain sensors 46 and a pair of temperature sensors 48. All of the sensors 44, 46 and 48 are to be applied to the exterior of the primary load bearing composite shell 28, see FIG. 3. The sensors 44, 46 and 48, the foam energy absorber in the space 36 and the CPU 32 are then overwound with the external composite shell 34.

The particular location of the integrally mounted sensors 44, 46 and 48 can be selected as necessary for the particular vessel design and are simply shown illustratively herein.

Figure 5:
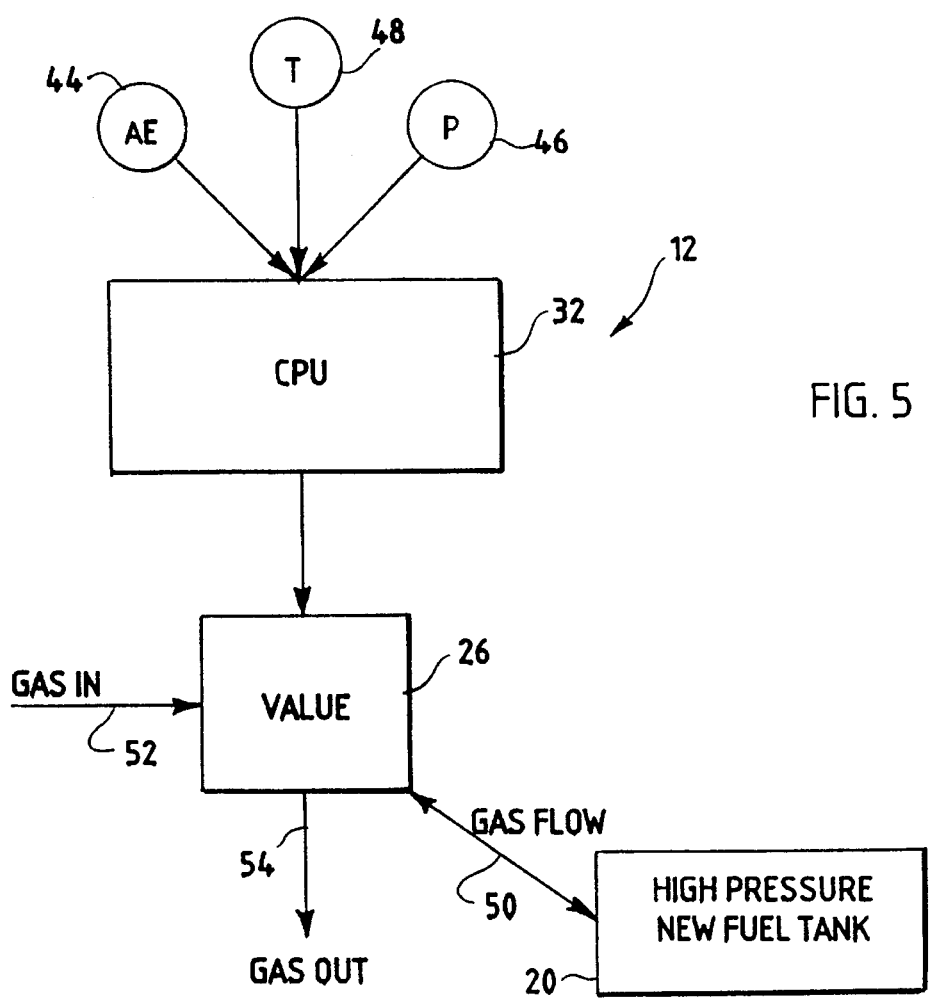
FIG. 5 is a block diagram showing the sensing and control apparatus of the vehicle fuel system of FIG. 2.

With reference to FIG. 5, a block diagram illustrates the components of the natural gas vehicle fuel system 12 according to the invention. The solenoid valve 26 is operatively coupled to the vessel 20 for permitting gas flow, illustrated by a line 50 between the vessel 20 and either a gas in line 52, from the filling inlet 16, see FIG. 1, or to a gas out line 54 to the engine 14. As is apparent, the lines 52 and 54 comprise portions of the fuel lines 18, shown in FIG. 1. In general, the valve 26 can be in a closed position so that neither the gas in line 52 or gas out line 54 is connected to the vessel 20. The valve can be actuated to a fill position to connect the gas in line 52 to the vessel 20, being closed to the gas out line 54. Finally, the valve 26 can be actuated to a supply position to connect the vessel 20 to the gas out line 54, keeping the gas in line 52 closed.

The valve 26 is controlled by commands received from the CPU 32. The CPU includes associated memory storing a control program for operating the valve. As is apparent, a general program must be provided to control normal filling and supply of fuel in accordance with that discussed above. The present invention relates particularly to programming the CPU 32 to prevent further operation of the solenoid valve 26 after the vessel 20 has exceeded a useful life expectancy. This determination is made collectively by the CPU 32 receiving the event information from the acoustic emission sensors 44, the pressure or strain sensors 46 and the temperature sensors 48.

In accordance with the invention, the natural gas vehicle fuel system 12 senses a variety of events that can be correlated to the life reduction of a composite pressure vessel used as a natural gas vehicle fuel tank. One such series of events is the number of cycles (empty-fill-empty) a tank has seen in its lifetime. Cyclic fatigue is, for most composite structures, more life limiting; than, for example, holding a tank at constant pressure. Further, the strain to which a tank is subjected as a fraction of the strain at failure for a new tank correlates well with the remaining life. For example, if one were to cause strain equal to one-third the ultimate strain at failure for a carbon fiber composite tank, it would likely withstand over 100,000 such cycles, whereas for a fiberglass composite tank, the life would be fewer than 50,000 cycles. Thus, in accordance with the invention, the strain sensors 46 and microcontroller 32 record the magnitude of strain within plural select ranges and the lo number of cycles. The cycle count is between a reasonable lower pressure or strain limit and an upper limit. A single strain gauge, or multiple strain gauges as shown, can give a broad range of readings. The microcontroller 32 is programmed to count a cycle when the internal tank pressure drops below, for example, 1,000 psi, which would equate to one-third full condition, and record the, peak pressure during the fill-up routine. Since not all refill stations incorporate accurate temperature compensation systems, a target fill pressure may be 3,600 psi for a full tank, but some stations might overpressurize the tank to, for example, 4,500 psi. Such overpressure fills reduce tank life. Therefore, the microcontroller 32 is programmed to count both the number of cycles above, for example a first range of 3,000 psi, and the number of cycles above, for example, a second range of 4,200 psi, and finally, any cycles above, for example, a third range of 5,000 psi.

A shut-down algorithm is programmed in the CPU 32 according to the composite materials used for the vessel 20. As an example of such a rule, the CPU 32 prevents further operation of the valve 26, i.e., maintains it in the closed position, if the vessel 20 exceeds, for example, 20,000 cycles between 1,000 and 3,000 psi, 10,000 cycles between 1,000 and 4,200 psi, or 100 cycles between 1,000 and 5,000 psi. Alternatively, a combination algorithm is provided which allows, for example, for up to 50% of the basic shut-down algorithm for each condition collectively. As such, shut-down occurs at 10,000 cycles at 1,000–3,000 psi, plus 2,500 cycles at 1,000–4,200 psi, plus 50 cycles at 1,000–5,000 psi.

When the shut-down rule event occurs, the CPU 32 sends a shut-off signal to the valve 26 to maintain it in the closed position mentioned above, i.e., with neither the gas in line 52 or the gas out line 54 operatively connected to the vessel 20. Alternatively, the CPU 32 could be programmed to allow the fuel in the tank 20 to be consumed, but not to allow another refill. Other variants of the control logic may be to activate a dash mounted or refill receptacle mounted light to advise the driver that only x more refills were available before the system automatically shuts down. This would be particularly useful for a dedicated, as opposed to bi-fuel, fuel vehicle.

Another life reducing factor is that of over-exposure to temperature that might either occur because of being involved in a fire or because of unplanned events such as might occur in an out-of-control paint oven. It is desirable to prevent refilling of any tank which has been exposed to a temperature, for example, above 400° F. for a time in excess of ten minutes. Each tank type has its own temperature sensitivity profile, but all composite tanks can be damaged by overheating. Accordingly, the temperature sensors 48, in the form of thermocouples, directly read temperature into the CPU 32. The CPU 32 is programmed to count time above a specific temperature threshold, such as 250° F., and to actuate a shut-down algorithm if, for example, a temperature of above 250° F. is sensed for over four hours, a temperature of above 300° F. is sustained for over two hours, a temperature above 350° F. is sustained for more than one hour, or at any temperature above 400° F. In addition to preventing a refill of the tank, the CPU 32 could be arranged to send a vent tank signal to an appropriately designed solenoid actuated valve 26.

It has also been demonstrated that externally mounted acoustic emission sensors can detect incipient failure by a count of the sound emissions in a given time period above a trigger level intensity. For example, 10,000 acoustic emission events of greater than 70 db intensity may be a warning that the structure is within eighty percent of its maximum life and should be removed from service.

While the natural gas vehicle system is disclosed herein utilizing acoustic emission, strain and temperature as input parameters, alternative sensing elements may be used providing a signal to the CPU 32 indicative of the vessel 20 exceeding a useful life expectancy.

In addition to using sensors, the CPU 32 includes an internal clock. If the tank 20 were held at a full pressure for, for example, twenty years, and were made of fiberglass, it would likely rupture from static fatigue. Accordingly, the CPU 32 is programmed with a time dependent operating life after which a cylinder is no longer capable of being refilled. A variant is to force a reinspection of cylinders every X years, for example, two years, in order to permit the cylinder to accept a refill. Such a feature involves a technician reset feature that would reset the "clock" for another time period base cycle.

With current battery technology, it is likely that the CPU 32 can be maintained by an integral battery. However, the valve 26 would likely need to be powered via the supply lines 42 to ensure sufficient power to provide actuation of the solenoid valve 26. This power can be provided either by the vehicle power supply or an external replaceable battery.

Thus, in accordance with the invention, there is disclosed a vehicle fuel system including sensors and controller for controlling a solenoid valve by preventing further operation of the solenoid valve after the vessel has exceeded a useful life expectancy.

I claim:

1. A natural gas vehicle fuel system comprising:

a composite pressure vessel for storing natural gas, the vessel including an internal storage space accessible via a port opening;

a solenoid valve operatively coupled to said port opening for selectively connecting said storage space to a natural gas supply for filling or to a vehicle engine, in use;

sensing means integrally mounted with said vessel for sensing a select event of vessel operation indicative of the vessel exceeding a useful life expectancy; and control means operatively associated with said sensing for controlling said solenoid valve operation, said control means preventing further operation of said solenoid valve after the vessel has exceeded the useful life expectancy.

2. The fuel system of claim 1 wherein said sensing means comprises a strain sensor.

3. The fuel system of claim 2 wherein said strain sensor and said control means count a number of fill cycles of said vessel and said control means prevents further operation of the solenoid valve after a select number of fill cycles.

4. The fuel system of claim 2 wherein said strain sensor and said control means count a number of fill cycles of said vessel within each of plural select fill pressure ranges and said control means prevents further operation of the solenoid valve after a distinct select number of fill cycles within each such pressure range.

5. The fuel system of claim 2 wherein said strain sensor and said control means count a number of fill cycles of said vessel within each of plural select fill pressure ranges and said control means prevents further operation of the solenoid valve after a select combined number of fill cycles within each such pressure range collectively.

6. The fuel system of claim 1 wherein said sensing means comprises a temperature sensor.

7. The fuel system of claim 6 wherein said control means includes means for determining if sensed temperature exceeds a select temperature limit for a select time period and in response thereto preventing further operation of said solenoid valve.

8. The fuel system of claim 6 wherein said control means includes means for determining if sensed temperature exceeds plural select temperature limits for a respective inversely related select time period and in response thereto preventing further operation of said solenoid valve.

9. The fuel system of claim 1 wherein said sensing means comprises an acoustic emission sensor.

10. The fuel system of claim 9 wherein said control means includes means for determining if a sensed acoustic emission exceeds a select limit for a select time period and in response thereto preventing further operation of said solenoid valve.

* * * * *